Sept. 26, 1961     T. A. ST. CLAIR     3,001,541
AUTOMATIC REGULATOR ASSEMBLY
Filed March 18, 1957     3 Sheets-Sheet 1
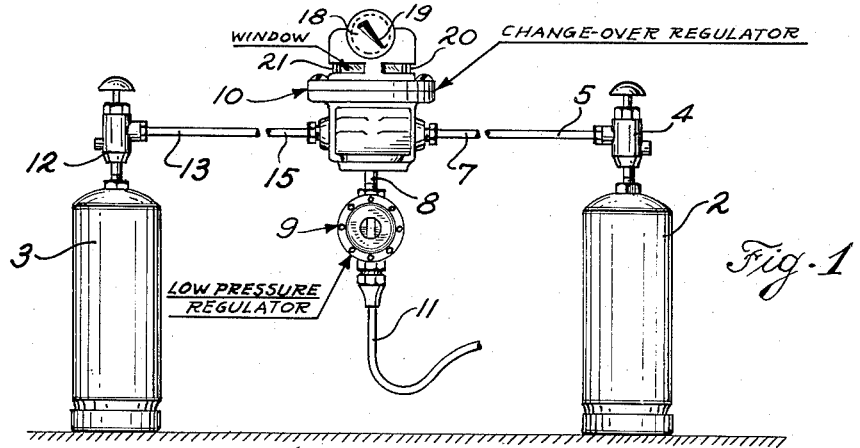
Fig. 1
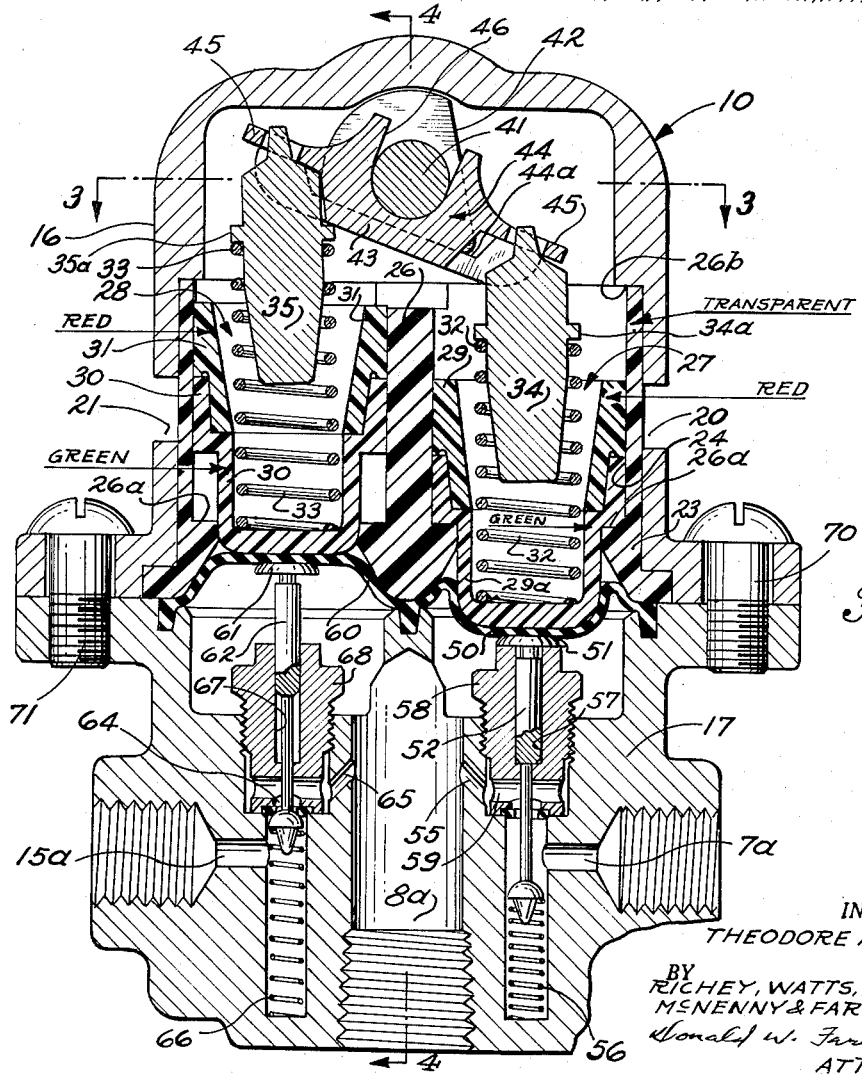
Fig. 2
INVENTOR.
THEODORE A. ST. CLAIR
BY RICHEY, WATTS, EDGERTON,
McNENNY & FARRINGTON.
ATTORNEYS

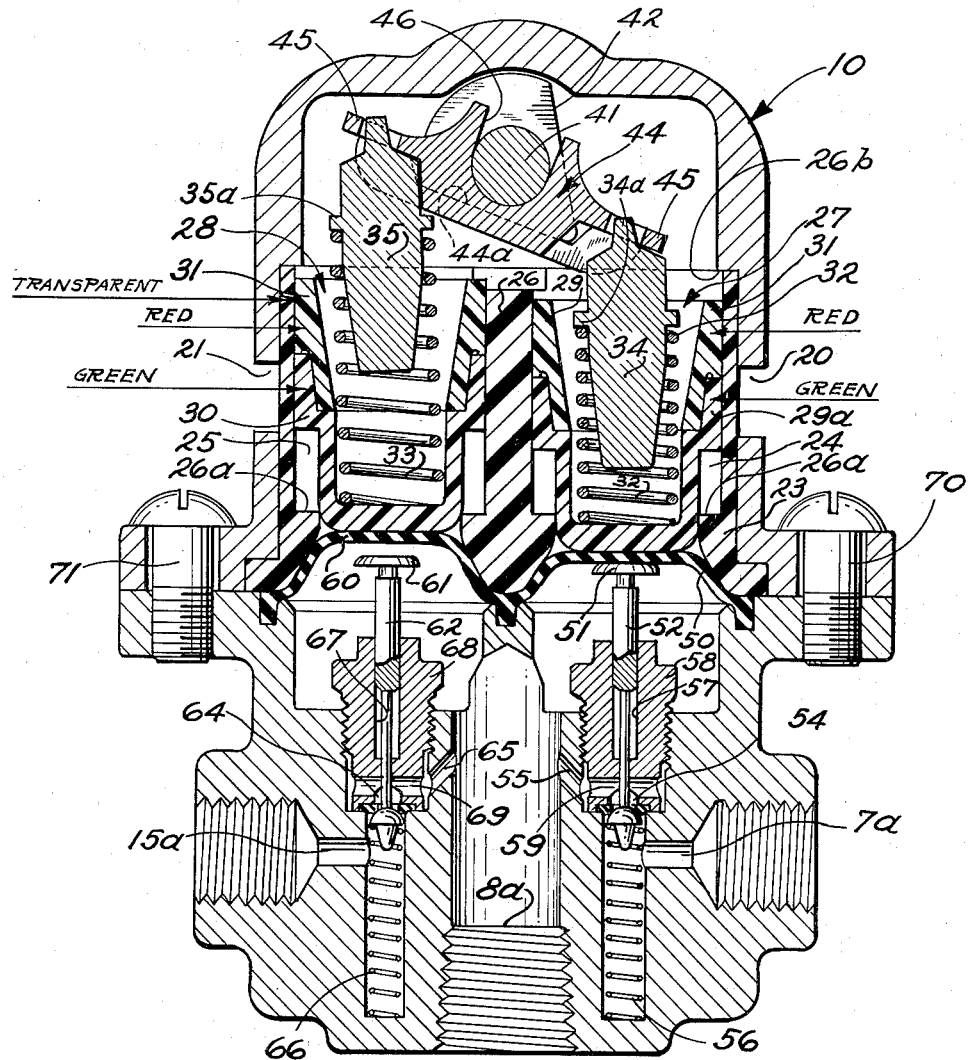

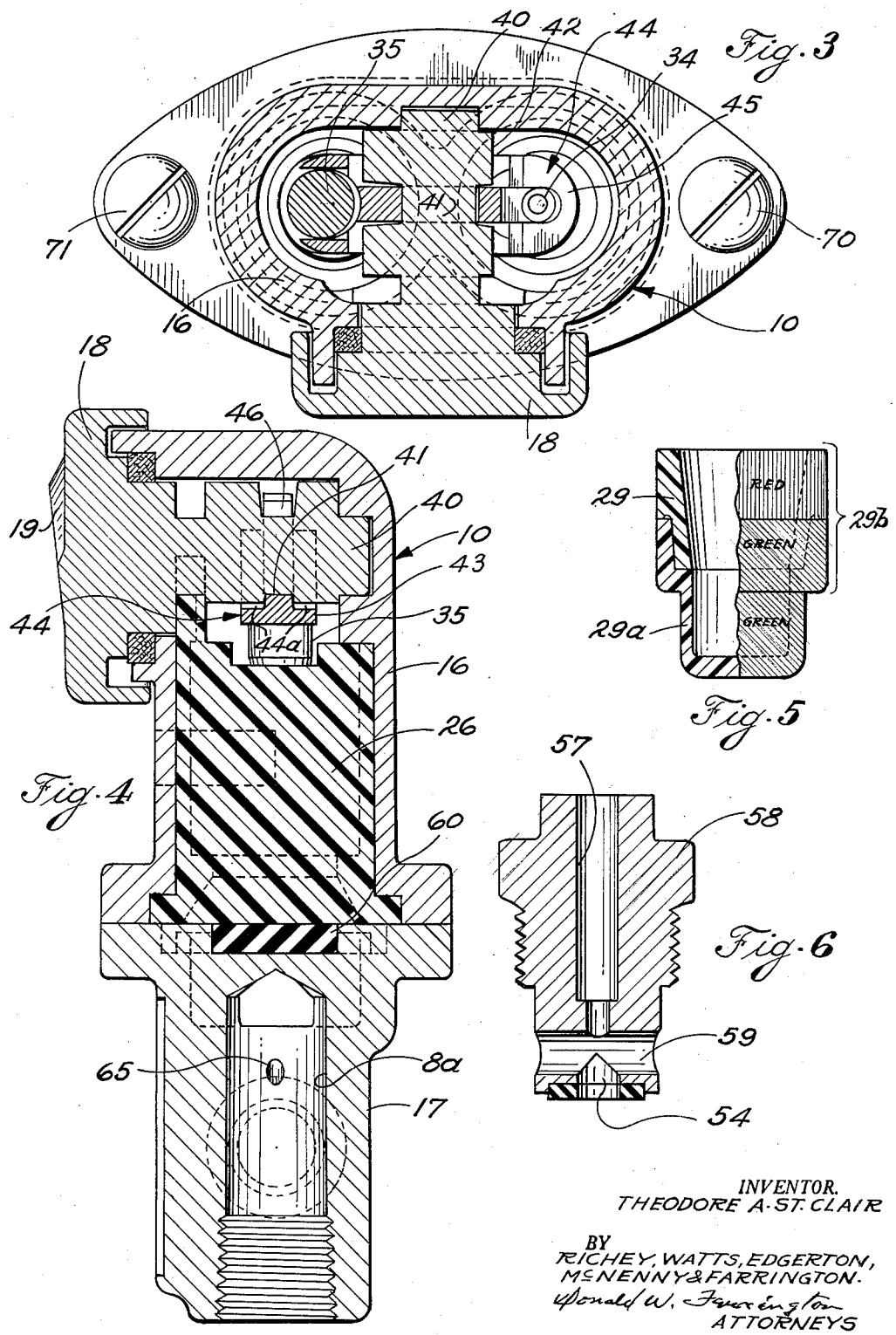

United States Patent Office 3,001,541
Patented Sept. 26, 1961

3,001,541
AUTOMATIC REGULATOR ASSEMBLY
Theodore A. St. Clair, Chagrin Falls, Ohio, assignor to
The Weatherhead Company, Cleveland, Ohio, a corporation of Ohio
Filed Mar. 18, 1957, Ser. No. 646,760
11 Claims. (Cl. 137—113)

This invention relates to a pressure regulator and more particularly a regulator of the type adapted to be connected to two different supply sources of liquefied petroleum gas and wherein the regulator will withdraw and regulate from one of the sources of supply until exhausted and will then automatically withdraw and regulate from the other supply source until the second source of supply has been exhausted. Although my invention is shown and described in the environment of a liquefied petroleum gas system it will be apparent that it may be used for the sequential withdrawal of other gases from two or more supply sources.

According to the present invention a regulator is provided which is adapted to be connected to two supply tanks and wherein the regulator sequentially uses each tank and provides a visual indication of the presence or absence of fuel in each of the tanks and wherein a manual control is provided so that the user may pre-set or determine the sequence of use.

It is among the objects of the present invention to provide a regulator adapted to be connected to two tanks which will first withdraw and regulate the withdrawal from one tank and thereafter, without interrupting the output from the regulator and without attention from the user, withdraw from the other fuel tank and wherein the regulator provides a visual indication that one tank has been emptied.

It is also among the objects of my invention to provide an automatic changeover regulator adapted to be connected to two sources of supply and wherein the regulator will first withdraw and regulate from one source of supply and will thereafter withdraw and regulate from the second source of supply when the first supply is exhausted and wherein the availability of both supply sources is visually indicated by the regulator. It is also an object of my invention to provide a changeover regulator wherein the regulator body is provided with an inlet leading to two different sources of supply and wherein diaphragms are backed up by a pair of spring capsules so that as the sources of supply are depleted by use such depletion will be visually indicated by the position of the spring capsules.

Further objects and advantages relating to efficiency in operation, low cost of manufacture, long life and accurate regulation of pressure will appear from the following description and the appended drawings wherein:

FIG. 1 is an elevation showing a regulator made according to the present invention connected to two sources of supply and to a low-pressure regulator leading to a use system;

FIG. 2 is an elevation in section of the regulator according to the present invention showing the position of the parts after one of the sources of supply has been exhausted and the fuel is being withdrawn and regulated from the other source of supply;

FIG. 3 is a sectional view of the regulator taken along the planes indicated at 3—3 of FIG. 2;

FIG. 4 is a sectional elevation through the regulator taken on the line indicated at 4—4 in FIG. 2;

FIG. 5 is an elevation with parts in section of a portion of the spring capsule employed in the regulator;

FIG. 6 is an enlarged sectional showing of the high pressure inlet port element of the regulator; and FIG. 7 is an elevation in section similar to the showing of FIG. 2 but illustrating the position of the parts when both of the sources of supply are available and fuel is withdrawn and regulated from one of the sources of supply.

Referring to the drawings, a supply tank of liquefied petroleum gas hereafter referred to as the right-hand tank is indicated at 2 in FIG. 1. A similar supply of liquefied petroleum gas hereafter referred to as the left-hand tank is indicated at 3 in FIG. 1. The right-hand tank equipped with tank valve 4 is connected through line 5 and pipe 7 to the changeover regulator indicated in its entirety as at 10. The outlet pipe 8 of the regulator leads through a low pressure regulator as at 9 and thence to the domestic supply system as at 11. The left-hand supply tank 3 is similarly provided with a tank valve 12, line 13 and line 15 leading to the left-hand inlet side of the changeover regulator 10.

The body of the regulator 10 is made up of upper and lower die-cast sections 16 and 17 respectively. The upper section 16 is provided with a manually adjusted knob 18 having an arrow or similar indicia as at 19 and a window 20 at the right-hand side of the regulator and a window 21 at the left-hand side of the regulator. As will be understood as this description proceeds the indicia 19 on the knob 18 indicates a starting position or setting of the regulator when both tanks are filled and the system is put into operation. Assuming that both supply tanks 2 and 3 are filled and the knob 18 is turned to the position shown in FIG. 1 with the arrow 19 pointing toward the right-hand tank 2, and further assuming that the visual indication through the right-hand window 20 is green and the visual indication through the left-hand window 21 is also green then the knob position and indications just described mean that fuel is being withdrawn from the right-hand tank 2 and such withdrawal is being regulated and conducted to the domestic supply line 11.

As will be understood from the description which follows; when the fuel supply in tank 2 has been depleted a red signal will be observed through the right-hand window 20. The supply to the domestic line 11 will not be interrupted by the depletion of the right-hand tank but will be continued by the withdrawal and regulation from the supply in the left-hand tank 3. The visual signal of the red color in the window 20 will indicate to the user that the right-hand tank 2 is empty and should be replaced. The red signal in the window 20 may be ignored by the user or for some other reason may not be observed by the user when it first appears but manifestly the right-hand tank 2 should be replenished before a similar red signal is observed in the left-hand window. It will be understood that one of the tanks, such as the right-hand tank 2 may be exhausted during the night or at a time when the user is not around. With the regulator of the present invention the left-hand tank will continue to supply fuel to the domestic system until it is completely empty without manually operating any part of the changeover regulator and thereafter will provide a visual indication of the depleted condition of the tank.

It will be understood that when a red signal appears in the window 20 the knob 18 should be turned and the valve 4 should be closed before tank 2 is replaced. After the tank 2 has been replaced the knob 18 that has been turned has the indicia 19 pointing to the left-hand supply tank indicating that the fuel supply will be withdrawn from the tank 3 and the tank 3 emptied before fuel is withdrawn from the re-filled right-hand tank 2. Valve 4 is opened after the knob 18 has been turned to open the supply from tank 2.

The upper body section 16 of the regulator is generally oval in cross-section as shown in FIG. 3 and within this oval shaped cavity a transparent plastic body 23 is inserted and said transparent body is provided with two vertically arranged cylindrical bores 24 at the right-hand side and 25 at the left-hand side as viewed in FIGS. 2 and 7. Between the two cylindrical bores 24 and 25 is a heavy wall section indicated at 26. The transparency of the plastic molding serves as a part of the window through which the differently colored portions of the diaphragm and spring capsules 27 and 28 may be observed.

Each of the spring capsules comprises a pair of telescopic sections. Referring to the right-hand spring capsule 27, the lower section (FIG. 5) includes a molded thimble 29a which is molded of a green plastic composition. The upper inner portion of the thimble 29a is shaped to receive a sleeve 29 formed of a red plastic composition. The right-hand thimble and sleeve assembly 29a and 29 is cemented or bonded to form an integral lower half of the capsule 27. The left-hand spring capsule 28 includes a lower thimble portion 30 molded of a green plastic composition and a sleeve portion 31 formed of a red plastic. The thimbles and sleeves are bonded to each other and provide a cylindrical bore to receive the lower end of the spring 32 in the right-hand capsule and 33 in the left-hand capsule. An inner core section which also may be of a molded plastic material is indicated at 34 in the right-hand spring capsule and 35 in the left-hand spring capsule. The cores 34 and 35 are mounted for longitudinal movement with respect to the capsules and have respective peripheral shoulders 34a and 35a. Thus it will be observed that the springs 32 and 33 engage respective shoulders 34a and 35a and tend to move the core sections 34 and 35 away from the corresponding lower thimble sections 29 and 30. The axial extent of the large diameter portion of the lower section of each spring capsule is indicated at 29b in FIG. 5. It will be observed that this large diameter portion of each capsule corresponds to the inner diameter of the bore which receives the spring capsule. The downward movement of each capsule in response to the bias of springs 32 and 33 is limited by shoulders 26a on the transparent insert 23. A shoulder 26b on the body of the regulator limits the upward travel of the spring capsule. The left-hand capsule 28 is in its uppermost position in FIG. 7. It will also be noted by reference to FIGS. 2 and 7 that each of the capsules may be shortened axially by sliding the core downward through the bore in the sleeve and into the lower thimble.

Each of the capsules 27 and 28 are positioned relative to each other in the body as determined by the position of the knob 18 which is journaled within the valve body by a boss 40 at the inner end of the knob body 41. The knob body 41 within the regulator is provided with diverging faces 42 and 43 and in FIGS. 2 and 7 the knob 18 is turned to a position so that the face 43 is disposed against a tilting plate 44 having the opposed ends 45 thereof bearing against the spring capsules 27 and 28 respectively. When the knob 18 is thus positioned, the indicia 19 points towards the supply tank 2. When turned so that the plate 44 will be in contact with the face 42, the indicia 19 points toward the supply tank 3.

Referring particularly to FIG. 7, it will be noted that the core in spring capsule 27 is moved downwardly to its lowermost operating position as determined by the position of the knob 18. The core in the spring capsule 28, on the other hand, is in its uppermost position as determined by the knob 18. The diaphragm 50 is thus positioned against the head 51 of the regulating valve member 52. As the pressure may be dropped by use through the line 8 at the outlet 8a of the valve the diaphragm 50 moves downwardly so as to open the port 54 admitting gas from the high pressure inlet as at 7a. Due to the fact that the left-hand spring capsule 28 is in its raised position the corresponding regulating movement of the left-hand diaphragm 60 is insufficient to bring the underside of the diaphragm 60 against the head 61 of the left-hand valve 62. Accordingly, the port 64 remains closed with respect to the left-hand inlet supply at 15a. Thus, during this phase of operation with the knob 18 pointing towards the tank 2 and there being a supply of gas under pressure in both tanks 2 and 3, only the supply from tank 2 is being used and only the diaphragm 50 and valve 52 are regulating the admission of gas from the right-hand tank 2. A green signal observed through windows 20 and 21 (FIG. 7) indicates an adequate supply of gas in the tanks and the indicia 19 indicates that tank 2 is being used to supply the use appliances. This condition is maintained as long as the supply in tank 2 is maintained at some predetermined value as, for example, above five or six pounds. As the supply available in tank 2 drops and the pressure drops therewith, the right-hand capsule 27 moves downwardly to increase the port opening 54 and the admission of gas from the tank 2. When, however, the supply in the right-hand tank is exhausted so that the pressure available therefrom drops to some predetermined value such as three and one-half or four pounds both diaphragms are lowered and the left-hand diaphragm 60 is lowered so that it comes in contact with the head 61 of the left-hand regulating valve 62. This new condition is illustrated by the position of the parts of the valve shown in FIG. 2. The red signal observed through window 20 at the right-hand side indicates that the right-hand tank as been exhausted and that gas is now being used from the left-hand tank 3. The gas now being admitted from the left-hand tank by way of inlet 15a through port 64, thence through the inclined bore 65 to the outlet of the valve at 8a is of a somewhat lower pressure than that heretofore drawn from the right-hand cylinder. Thus, without any attention from the user and without the manipulation of any knob or other valves the use has been automatically switched from tank 2 to tank 3.

Upon observing the condition indicated by the parts in FIG. 2 the user is instructed to replace the tank 2. When tank 2 has been replaced the user is instructed to turn the knob 18 so that indicia 19 points toward the tank 3. This change of the knob position will bring a face 42 of the knob into contact with the tilting plate 44 and thus position the right-hand spring capsule at its highest position and will lower the left-hand spring capsule 28 to its lower operating position. The supply would continue to be drawn from tank 3 and the position of the parts within the valve would be substantially the reverse of that illustrated by FIG. 7. The color signal observable through both windows 20 and 21 would be a green signal and the left-hand diaphragm 60 would be effective to regulate the admission from the left-hand tank 3. The right-hand diaphragm 50 would be spaced up away from the head 51 of the right-hand regulating valve 52 so that there would be no regulation admitting gas from the right-hand tank 2. The right-hand regulating valve member 52 is provided with a spring 56 arranged to bias the valve member 52 at its highest position so that the rounded closure member seats against a resilient seat member in the port 54. A similar spring 66 is arranged to urge the left-hand valve member 62 to its closed position. When the valve 52 is regulating the valve stem is guided vertically in the bore 57 of the plug 58. The plug 58 is provided with a transverse counterbore 59 so as to permit the gas being regulated to move through the port 54, thence laterally through the counterbore 59 and thence through the inclined bore 55 into the outlet 8a. A corresponding arrangement for the left-hand valve includes the plug 68 having a vertical bore 67 and transverse bore 69.

The valve according to the present invention provides for a novel arrangement of the parts facilitating their assembly. The upper die-cast section 16 may be held as a cup with the knob 18 positioned as shown in FIG. 4. The tilting plate 44 may be inserted through the open end of the section 16 and the transparent molded element 23 carrying the spring capsules may be lowered into the die-cast section 16. Thus the moving parts of the valve housed by the die-cast section 16 are nested within the housing 16. The regulating valves including the plugs 58 and 68 are assembled in the lower die-cast section 17 by being threaded therein after the springs 56 and 66 have been dropped into the bores which receive said springs. The flexible rubber-like element which forms the diaphragms 50 and 60 is then secured in position by being clamped between the upper and lower sections by means of screws as at 70 and 71. The flange on the transparent insert 23 overhangs a shoulder in the upper section 16 so that the screws 70 and 71 hold the parts in assembled operating position.

From the foregoing description it will be understood that I have provided an automatic changeover regulator which indicates the supply condition in each of two tanks at all times. If the valve is left unattended it will first use up the entire supply in one tank and automatically switch over and withdraw the entire supply of the other tank without interrupting the service to the domestic supply line. The valve also provides a manual control so that the user may select and determine which of two sources shall be used first. The valve provides a constant visual indication of which of two sources of supply is being used and at the same time gives a visual indication of the pressure conditions from each of two supply sources.

Although I have illustrated and described one form of my invention in considerable detail it will be appreciated that numerous modifications may be made therein without departing from the scope of the invention as defined in the following claims.

I claim:

1. A changeover regulator for sequentially using two separate sources of liquefied petroleum gas comprising a body formed of upper and lower complementary sections, said lower section having a pair of diaphragm cavities arranged side-by-side and opening into a common outlet, a diaphragm for each of said diaphragm cavities clamped between said upper and lower complementary sections, said lower section having a first inlet adapted to be connected to one source of supply and a regulating valve for said inlet having a stem portion extending upwardly from the inlet to be engaged by the underside of one of said diaphragms, said lower section having a second inlet adapted to be connected to said other source of supply and a second regulating valve having a stem portion thereof extending upwardly towards said other diaphragm to be engaged by the underside of said other diaphragm, said upper body section having a pair of cylindrical bores co-axially arranged individually with respect to said diaphragms and said regulating valves, respectively, a spring assembly in each bore comprising a telescopic cup-like section engaging the upper side of the respective diaphragm, an expansion spring in said cup-like section and an elongated core biased upwardly by said expansion spring, a manually operable cam member carried in said upper body section between said spring assemblies and adjacent that end of the spring assembly remote from the diaphragm, a tilting plate overhanging both of said spring assemblies and engageable with the respective cores thereof, said tilting plate being tiltable by said manually operable member downward toward one of said diaphragms and upward away from the other diaphragm to selectively bias one of said spring assemblies toward the lower body section more than the other spring assembly is biased towards the lower body section, whereby that spring assembly having the maximum downward bias moves its diaphragm downward into regulating engagement with its regulating valve to effect withdrawal and regulation of the supply through the corresponding inlet before withdrawal and regulation of the supply through the other inlet is effected.

2. A changeover regulator for sequentially using two separate sources of liquefied petroleum gas comprising a body formed of upper and lower complementary sections, said lower section having a pair of diaphragm cavities arranged side-by-side and opening into a common outlet, a diaphragm for each of said diaphragm cavities clamped between said upper and lower complementary sections, said lower section having a first inlet adapted to be connected to one source of supply and a regulating valve for said inlet having a portion extending from the inlet to be engaged by the underside of one of said diaphragms, said lower section having a second inlet adapted to be connected to said other source of supply and a second regulating valve having a portion thereof extending towards said other diaphragm for regulating the admission of gas from said other source of supply, said upper body section having a pair of cylindrical bores co-axially arranged individually with respect to said diaphragms and said regulating valves, respectively, a spring assembly in each bore comprising a telescopic cup-like section engaging the upper side of the respective diaphragm, an expansion spring in said cup-like section and an elongated core biased upwardly by said expansion spring, said upper body section having a window therein for each bore, the core in each spring assembly being visible through the corresponding window, a manually operable cam member carried in said upper body section between said spring assemblies and adjacent that end of the spring assembly remote from the diaphragm, a tilting plate overhanging both of said spring assemblies and engageable with the respective cores thereof, said tilting plate being tiltable by said manually operable member to selectively project one of said spring assemblies downward towards the lower body section a greater distance than the other spring assembly is projected towards the lower body section, whereby that spring assembly having the maximum projection brings its diaphragm into regulating engagement with its regulating valve to effect withdrawal and regulation of the supply through the corresponding inlet before withdrawal and regulation of the supply through the other inlet may be effected.

3. A changeover regulator for sequentially withdrawing and regulating gas from two separate tanks comprising a regulator body having one inlet adapted to be connected to one tank and a second inlet adapted to be connected to the other tank, said body having a common outlet, a passageway leading from the first-named inlet to the common outlet, said passageway having a regulating valve therein, a passageway leading from said second inlet to the common outlet, said passageway having a second regulating valve therein, said regulator body having a first diaphragm therein arranged to operatively engage said first regulating valve, said body having a second diaphragm therein arranged to operatively engage said second regulating valve, said regulator body having a first spring and indicator assembly arranged to back up said first-named diaphragm and having a second spring and indicator assembly arranged to back up said second diaphragm, each of said spring assemblies comprising a slidably mounted indicator member movable to a terminal position and a compression spring biasing said indicator member against the corresponding diaphragm and toward said terminal position, said body having a pair of transparent windows through which the respective slidable indicator members are visible individually indicating when each said indicator member is in its terminal position, manually operable means to selectively compress one of said springs more than the other by an amount which insures movement of the indicator associated with said one spring to its terminal position before the other spring operates to cause operative engagement between the diaphragm associated therewith and its regulator valve whereby said one spring and indicator assembly effects regulating movement of said one regulating valve and depletion of one tank before regulation is effected by said second regulating valve.

4. A changeover regulator for sequentially withdrawing and regulating liquefied petroleum gas from two separate tanks comprising a regulator body having one inlet adapted to be connected to one tank and a second inlet adapted to be connected to the other tank, said body having a common outlet, a passageway leading from the first-named inlet to the common outlet, said passageway having a regulating valve therein, a passageway leading from said second inlet to the common outlet, said passageway having a second regulating valve therein, said regulator body having a first diaphragm therein arranged to operatively engage said first regulating valve, said body having a second diaphragm therein arranged to operatively engage said second regulating valve, said regulator body having a first spring assembly arranged to back up said first-named diaphragm and having a second spring assembly arranged to back up said second diaphragm, each of said spring assemblies including a telescoping cup and an elongated core with a spring compressed between the respective cups and cores, said body having a window opposite the cup of each assembly to show its position with respect to its diaphragm, manually operable means to selectively compress one of said spring assemblies whereby said one spring assembly effects regulating movement of said one valve before regulation may be effected by said second valve and depletion of one tank is indicated through said window.

5. A changeover regulator comprising a die-cast body formed of two complementary sections, said regulator body having a pair of diaphragms clamped between the adjacent body sections, a regulator assembly for each of said diaphragms including a regulator valve for admitting one source of supply to the body associated with one diaphragm and a similar regulating valve for admitting fuel from another source associated with said other diaphragm, a separate spring assembly for each of said diaphragms carried within the body in axial alignment with the regulating valves and on that side of the diaphragm remote from the regulating valves, a transparent plastic insert within one of said body sections between the wall of the body and the spring assembly, said spring assemblies each including differently colored exterior portions, window openings in the die-cast body adjacent said plastic insert whereby the color observed through said window openings indicates the position of the spring assembly within the body and manually operable means for maintaining one of said spring assemblies in a lowered position with respect to its associated diaphragm whereby the regulating valve controlled by said last-mentioned diaphragm is opened and fuel is withdrawn from one supply and said one supply exhausted before the other regulator is moved to regulating position by said other diaphragm.

6. A changeover regulator comprising a die-cast body formed of two complementary sections, said regulator body having a pair of diaphragms clamped between the adjacent body sections, a regulator assembly for each of said diaphragms including a regulator valve for admitting one source of supply to the body associated with one diaphragm and a similar regulating valve for admitting fuel from another source associated with said other diaphragm, a common outlet opening into each of said regulator valves, a separate spring capsule for each of said diaphragms mounted for movement within the body in axial alignment with the regulating valves and on that side of the diaphragm remote from the regulating valves, a transparent insert within said body section between the capsule and the body wall, said spring capsules including differently colored portions along the exterior thereof, window openings in the die-cast body, each window having a height less than the axial extent of one color on the capsule adjacent said plastic insert whereby the color observed through said openings indicates the position of the spring capsule within the body and manually operable means for biasing one of said spring capsules in a lowered position with respect to its associated diaphragm whereby the regulating valve controlled by said last-mentioned diaphragm is opened and fuel is withdrawn from one supply before the other regulator is moved to regulating position by said other diaphragm.

7. A regulator for use in a liquefied petroleum gas system wherein two separate supply tanks are connected to the regulator for regulating the output to a system wherein the gas is used comprising a regulator body having one inlet and another inlet, a passageway leading from the first-named inlet to a common outlet and a passageway leading from the second-named inlet to a common outlet, a regulator valve in said first passageway adapted to be moved to open and closed positions so as to open or close the first-named inlet with respect to the common outlet, a regulator valve arranged in the said passageway for said second-named inlet and adapted to be moved to open and closed position to open or close said common outlet with respect to said second inlet, said regulator body comprising upper and lower complementary sections, said lower section having a diaphragm chamber in alignment with said first-named regulating valve, said lower section having a second diaphragm chamber in alignment with said second-named regulating valve, a flexible rubber-like diaphragm proportioned to cover both of said diaphragm chambers clamped between said upper and lower body sections, said upper body section having a transparent plastic insert provided with a flange clamped between said upper and lower sections, said insert having a first cylindrical bore co-axial with said first-named regulator valve, said insert having a second cylindrical bore co-axial with said second-named regulator valve, spring capsules mounted for sliding movement in each of said cylindrical bores, said spring capsules each comprising an outer cup-like section telescopically receiving an inner core section, said outer cup-like section having portions along its length of different color, said upper body section of the regulator having window openings in the wall thereof whereby the position of the spring capsules with respect to their diaphragms may be observed and the pressure condition at the inlets thereby determined visually through said body openings.

8. A regulator for use in a liquefied petroleum gas system wherein two separate supply tanks are connected to the regulator for regulating the output to a system wherein the gas is used comprising a regulator body having one inlet and another inlet, a passageway leading from the first-named inlet to a common outlet and a passageway leading from the second-named inlet to a common outlet, a regulator valve in said first passageway adapted to be moved to open and closed positions so as to open or close the first-named inlet with respect to the common outlet, a regulator valve arranged in the said passageway for said second-named inlet and adapted to be moved to open and closed position to open or close said common outlet with respect to said second inlet, said regulator body comprising upper and lower complementary sections, said lower section having a diaphragm chamber in alignment with said first-named regulating valve, said lower section having a second diaphragm chamber in alignment with said second-named regulating valve, a flexible rubber-like diaphragm proportioned to cover both of said diaphragm chambers clamped between said upper and lower body sections, said upper body section having a transparent plastic insert provided with a flange clamped between said upper and lower sections, said insert having a first cylindrical bore co-axial with said first-named regulator valve, said insert having a second cylindrical bore co-axial with said second-named regulator valve, spring capsules mounted for sliding movement in each of said cylindrical bores, said spring capsules each comprising an outer cup-like section telescopically receiving an inner core section, said outer cup-like section having portions along its length of different color, said upper body section of the regulator having window openings in the wall thereof whereby the position of the spring capsules may be observed and the pressure condition at the inlets determined visually through said body openings, and a manually operable knob mounted in the regulator operatively connected to both of said capsules to provide a different position within the cylindrical bore for each capsule.

9. A changeover regulator for use with liquefied petroleum gas systems wherein two separate supply tanks are connected to the regulator and the fuel supply is withdrawn and regulated sequentially from the two supply tanks comprising a body having upper and lower cuplike sections, said lower section having a first inlet adapted to be connected to one supply tank and a second inlet adapted to be connected to the other supply tank and a regulator valve for each of said inlets, a diaphragm for each of said regulator valves and a single outlet opening into said two diaphragm chambers, said upper section having a first cylindrical bore aligned with said first-named regulator valve and a second cylindrical bore aligned with said second regulator valve, a diaphragm clamped between said upper and lower sections proportioned to overhang both of said diaphragm chambers, a spring capsule slidably mounted in each of said cylindrical bores, the spring capsule in the first-named cylindrical bore having one end thereof bearing against said diaphragm above said first-named regulator valve and the other end of said spring capsule being biased away from said diaphragm, the second-named spring capsule having its lower end arranged to bear against the diaphragm opposite the second-named regulator valve, a tiltable abutment plate within said upper body section, one end of said plate bearing against said first-named spring capsule and the other end of said abutment plate bearing against the end of said second-named spring capsule and a manually rotatable cam carried within said upper body section, said cam having a pair of oppositely diverging flat faces whereby rotation of the cam to one position tilts said plate to compress one of said spring capsules more than the other spring capsule whereby one of said regulator valves is effective to withdraw and regulate the supply from one tank before the other regulator valve is effective to withdraw and regulate the supply from the other tank.

10. A changeover regulator for use with liquefied petroleum gas systems wherein two separate supply tanks are connected to the regulator and the fuel supply is withdrawn and regulated sequentially from the two supply tanks comprising a body having upper and lower cuplike sections, said lower section having a first inlet adapted to be connected to one supply tank and a second inlet adapted to be connected to the other supply tank and a regulator valve for each of said inlets, a diaphragm for each of said regulator valves and a single outlet opening into said two diaphragm chambers, said upper section having a first cylindrical bore aligned with said first-named regulator valve and a second cylindrical bore aligned with said second regulator valve, a diaphragm clamped between said upper and lower sections proportioned to overhang both of said diaphragm chambers, a spring capsule slidably mounted in each of said cylindrical bores, each of said capsules having color indicia on its exterior, the spring capsule in the first-named cylindrical bore having one end thereof bearing against said diaphragm above said first-named regulator valve and the other end of said spring capsule being biased away from said diaphragm, the second-named spring capsule having its lower end arranged to bear against the diaphragm opposite the second-named regulator valve, a tiltable abutment plate within said upper body section, one end of said plate bearing against said first-named spring capsule and the other end of said abutment plate bearing against the end of said second-named spring capsule and a manually rotatable cam carried within said upper body section, said cam having a pair of oppositely diverging flat faces whereby rotation of the cam to one position tilts said plate to compress one of said spring capsules more than the other spring capsule, said upper body sections having window openings in the wall thereof to expose the color indicia on the spring capsules.

11. A regulator for controlling the withdrawal of pressure fluid from two separate sources, said regulator comprising a housing having two separate inlets and a common outlet, a pair of separate pressure-responsive members in said housing exposed to the fluid pressure in said outlet and movable in response to such pressure, a pair of inlet valves at said inlets at one side of said pressure-responsive members and operated individually by the respective pressure-responsive members, a pair of separate pressure indicators each of which are visible at the outside of said housing and which are each slidably mounted at the opposite side of said pressure-responsive members for movement toward said inlet valve to a terminal position and away from said inlet valves to other positions spaced from said terminal position, a pair of individual spring means biasing said pressure indicators individually against the respective pressure-responsive members towards their terminal positions in opposition to the fluid pressure in said outlet, so that the movement of each pressure-responsive member and the opening and closing of each of said inlet valves is controlled jointly by the respective spring means and the fluid pressure in said outlet, and means for selectively adjusting both of said spring means together so that one of said spring means exerts a greater bias against its perssure indicator and the corresponding pressure-responsive member than the other spring means exerts against its pressure indicator and the corresponding pressure-responsive member by an amount which insures movement of the indicator associated with said one spring to its terminal position before the other spring operates to cause operation of the inlet valve associated with said other spring.

References Cited in the file of this patent

UNITED STATES PATENTS

| | | |
|---|---|---|
| 1,899,296 | Stein | Feb. 28, 1933 |
| 2,126,355 | Thomas | Aug. 9, 1938 |
| 2,163,132 | Roney | June 30, 1939 |
| 2,380,956 | Evarts | Aug. 7, 1945 |
| 2,497,558 | Reeves | Feb. 14, 1950 |
| 2,518,894 | Humbarger et al. | Aug. 15, 1950 |
| 2,592,259 | Eddy et al. | Apr. 8, 1952 |
| 2,630,821 | Arey et al. | Mar. 10, 1953 |
| 2,687,140 | St. Clair | Aug. 24, 1954 |